May 24, 1966    W. C. HAZEN ETAL    3,252,272
APPARATUS FOR SEPARATING MATERIALS
Filed Jan. 11, 1962
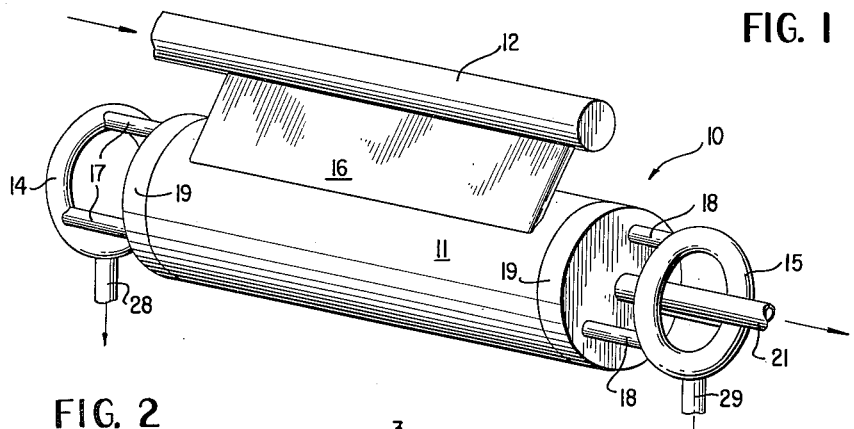
FIG. 1
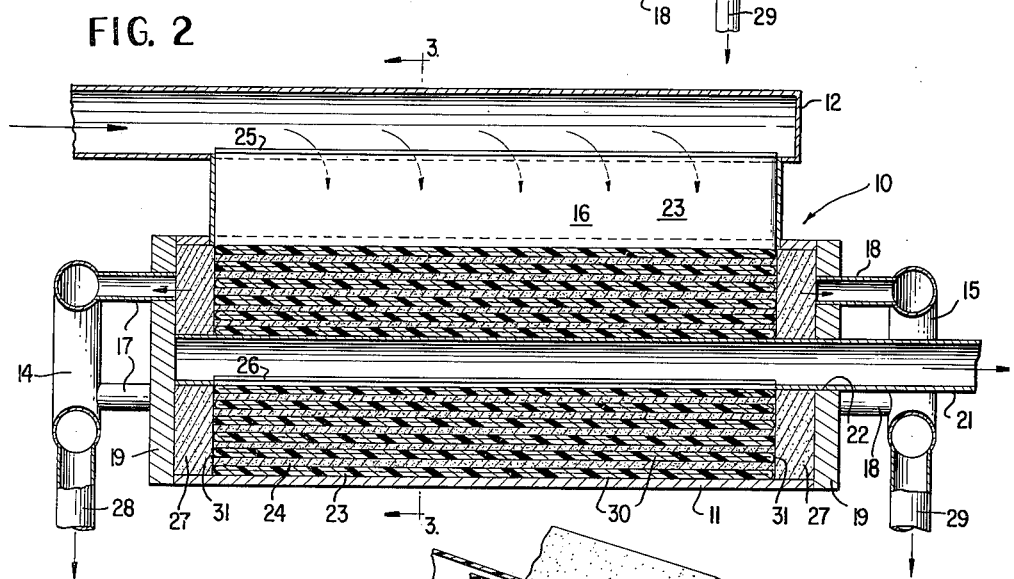
FIG. 2
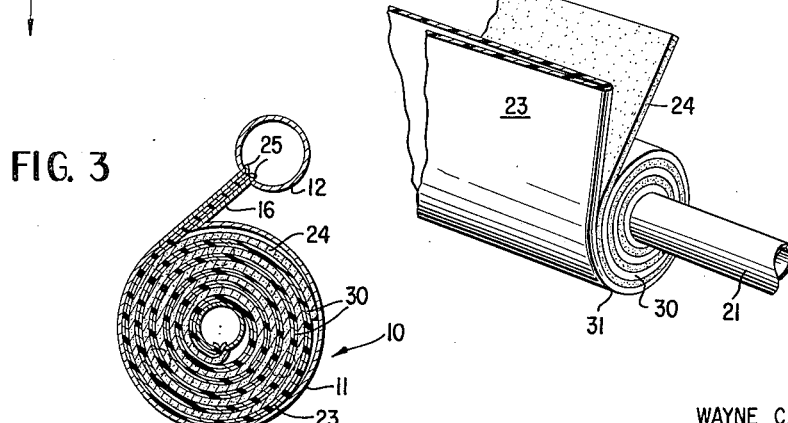
FIG. 3
FIG. 4
INVENTORS.
WAYNE C. HAZEN
ANGUS V. HENDRICKSON
BY Shanley & O'Neil
ATTORNEYS.

3,252,272
APPARATUS FOR SEPARATING MATERIALS
Wayne C. Hazen and Angus V. Henrickson, Wheat Ridge, Colo., assignors to Kerr-McGee Oil Industries, Inc., a corporation of Delaware
Filed Jan. 11, 1962, Ser. No. 165,594
3 Claims. (Cl. 55—158)

This invention relates to apparatus for the separation of gaseous mixtures containing two or more components having different diffusion rates.

Gaseous mixtures containing components having different rates of diffusion have been separated heretofore utilizing thin, flexible, membranes as diffusion barriers. However, the amount of surface area required for the diffusion membrane and its support since it has little strength has been a longstanding problem in the art. One method of obtaining the large surface area required for the membrane and its support is to prepare a plurality of membranes in the form of uniform sheets, and then stack them with a more porous material alternating with the membrane sheets in a sandwich-type structure. This type of construction is expensive when large surface areas are required, and a large amount of sealing along the edges is required. Also, each diffusion cell must be intricately manifolded to lead gases to and from the cell. A large number of cells are usually required, since, as a general rule, only one membrane may be utilized in each cell.

The present invention provides apparatus which overcomes the disadvantages of the prior art, and which renders it possible for the first time to support a large surface area of a flexible membrane utilizable in diffusion processes without the necessity for elaborate apparatus. In accordance with the present invention, it is possible to support large surface areas of a flexible diffusion membrane utilizing a single cell which may be of very compact design and require only a minimum of auxiliary apparatus for feeding and withdrawing gases to and from the cell.

It is an object of the present invention to provide improved apparatus for separating gaseous mixtures by diffusion which utilizes a flexible diffusion membrane.

It is a further object of the invention to provide an improved cell design and arrangement for support of a flexible membrane therein which is useful in the separation of gaseous mixtures by diffusion.

Still other objects and advantages of the present invention will be apparent to those skilled in the art upon reference to the following detailed description and the drawings, wherein:

FIGURE 1 is a view in elevation of the apparatus of the invention;

FIGURE 2 is a longitudinal sectional view of the apparatus of FIGURE 1;

FIGURE 3 is a cross-sectional view taken along the line 3—3 of FIGURE 2; and

FIGURE 4 is a view, with portions thereof broken away, illustrating the manner in which the diffusion membrane and a porous separator may be wound upon an outlet manifold in the apparatus of FIGURES 1–3.

Referring now to the drawings, the gas diffusion apparatus generally referred to as 10 includes a tubular container 11 provided with an inlet manifold 12 and outlet manifolds 14 and 15. The inlet manifold 12 is spaced from the container 11, and a diffusion membrane support member 16 in the form of a conduit of generally rectangular cross section extends therebetween and is in communication with the interior. The outlet manifolds 14 and 15 likewise are spaced from the container 11, and are provided with conduits 17 and 18, respectively, which are in communication with the interiors of their respective manifolds and the interior of the container 11. The container 11 also is provided with an outlet manifold 21 which may be of tubular cross section and extend through opening 22 in cartridge 11.

A thin, flexible diffusion membrane 23 in the form of a continuous length of conduit, which may originally have been of tubular cross section and flattened as shown in the drawings, may be wound upon outlet manifold 21 alternately with a continuous strip of porous spacing member 24. One end of diffusion membrane 23 is attached to the interior of inlet manifold 12 after passing through slot 25 by any convenient method such as with an adhesive or by clamping means. The diffusion membrane 23 extends downward from the point of attachment through support member 16 into container 11, where after making the required number of turns, it terminates in the interior of outlet manifold 21 upon passing through slot 26. The membrane 23 likewise may be attached to the interior of outlet manifold 21 by means of an adhesive, clamping means, or by other convenient means.

If desired, circular porous spacing members 27 may be provided at either end of the container 11 for the purpose of supporting the side edges of the diffusion membrane 23. The diffused gas passes readily through the porous spacing members 27 into conduits 17 and 18, and then via outlet manifolds 14 and 15 and conduits 28 and 29, respectively, to further processing or storage as desired.

In operating the gas diffusion apparatus 10, a gaseous feed mixture to be separated into a fraction enriched in diffusible component and a fraction lean in diffusible component is fed to diffusion membrane 23 by means of inlet manifold 12. The gaseous feed mixture is passed through the diffusion membrane 23 via each of the turns 30, with a portion of the diffusible component being diffused through the walls into the porous spacing member 24 in the interior of container 11, until eventually undiffused gas lean in diffusible component is passed into outlet manifold 21 and withdrawn. The diffused gas passes through the porous spacing members 24 and 27 and is finally withdrawn from the ends of the container 11 via conduits 17 and 18, passed to manifolds 14 and 15 and withdrawn therefrom via conduits 28 and 29. A vacuum pump may be connected to conduits 28 and 29 to aid in withdrawing diffused gas, if desired. It will be apparent that an extremely large surface area of diffusion membrane 23 is arranged in the relatively small volume of container 11, and yet proper support is provided therefor without a necessity for the usual elaborate apparatus.

While a porous spacing member 24 is usually preferred, it is not always necessary and may be eliminated when this is desired. In such instances, the diffusion membrane 23 may be wound loosely around the manifold 21 to assure a small spacing between the various turns, and to allow for an expansion of the sides of the diffusion membrane when gaseous mixture under pressure is fed thereto to support the adjacent turns. Similarly, the porous spacing members 27 may be eliminated and the ends 19 allowed to abut the edges 31 of diffusion membrane 23 and be supported thereby. Thus, in such instances the membrane 23 is supported along its outer turn and side edges by means of the container 11 and ends 19, and the various internal turns are supported by adjacent turns of membrane 23.

While the diffusion membrane 23 has been illustrated and described herein as being initially of tubular cross section, compressed, and then wrapped spirally upon itself around outlet manifold 21, still other methods may be employed for arranging it within container 11. For instance, a plurality of sections of the diffusion membrane 23 may be folded upon each other in a container, with or without a porous separating member, to thereby provide internal sections which are supported by adjacent sections and outer sections and ends which are supported by the container. The container may be provided with inlet and outlet manifolds as illustrated for container 11. The outer surface of the diffusion membrane may be provided with a material integral therewith which serves as a self-contained spacing member when desired such as a porous material or an irregularly shaped surface which prevents the adjacent sections of membrane from being in close contact and allows diffused gas to flow between the surfaces. Still other modifications are possible, and are within the scope of the invention.

A wide variety of materials may be used in constructing diffusion membrane 23. Such materials are well known to the art, and a specific material for use in the present invention may be selected by one skilled in the art. Examples of materials include polyethylene, polyvinyl chloride, polyvinyl acetate, copolymers of vinyl chloride and vinyl acetate, polyethylene terephthalate, cellulose acetate butyrate, ethyl cellulose, polybutadiene, and polystyrene. In many instances, a diffusion membrane formed of polystyrene is preferred for separating certain gaseous mixtures of commercial importance such as helium from a natural gas or hydrogen from various gaseous mixtures. The above materials are satisfactory as diffusion membranes in thicknesses as used in the diffusion processes of the prior art. Often thicknesses of about 0.0001 to 0.01 inch are preferred, although in some instances thicker or thinner membranes may be used. In many instances it is preferred that the membrane be about 0.001 inch in thickness.

The apparatus of the invention is highly efficient for the separation of a diffusate which is enriched in helium content from a helium-containing natural gas. For instance, a helium rich fraction may be separated from natural gas containing 0.41% by volume helium using a diffusion membrane formed of polystyrene having a thickness of 0.001 inch. The pressure differential between the diffusion membrane 23 and the container 11 may be approximately one atmosphere and the temperature of the inlet gas may be 24° C. When operating under such conditions, the enrichment factor is found to be approximately 46 and the percent helium by volume in the diffusate withdrawn via conduits 28 and 29 is 18.7%. This enriched diffusate may be used as feed to additional cells of the type described herein to eventually obtain a substantially pure helium product if desired.

The foregoing detailed description is for purposes of illustration only, and it is not intended as being limiting to the spirit or scope of the appended claims.

What is claimed is:

1. Apparatus for separating a gaseous mixture containing first and second components having different diffusion rates into at least two fractions comprising a container means having an elongated cavity therein sealed off from the ambient atmosphere by means including first and second end portions, a flexible diffusion barrier selectively permeable with respect to the first component of the gaseous mixture whereby the first component diffuses therethrough faster than the second component, the diffusion barrier being in the form of a first elongated conduit for passing gases which is open at each end whereby first and second open ends are provided, a second elongated conduit for passing gases, a portion of the second conduit being positioned within the cavity in the container and an end portion thereof extending outside of the container, at least a portion of the diffusion barrier being spirally wound around the portion of the second conduit positioned within the cavity, an opening in the portion of the second conduit positioned within the cavity, the first open end of the diffusion barrier being in sealing engagement with a portion of the second conduit adjacent the opening therein and positioned whereby the interior of the first conduit is in communication with the interior of the second conduit, means for feeding gaseous mixture to be separated into the second open end of the diffusion barrier, conduit means for withdrawing diffused gas enriched with respect to the first component of the gaseous mixture from the first and second end portions of the container means, and means including the second elongated conduit for withdrawing undiffused gas enriched with respect to the second component of the gaseous mixture from the container means.

2. The apparatus of claim 1 wherein a porous material is provided between the spaced portions of the conduit.

3. The apparatus of claim 1 wherein the diffusion barrier is formed of polystyrene.

References Cited by the Examiner

UNITED STATES PATENTS

| 2,400,076 | 5/1946 | Dauster | 55—498 |
| 2,540,152 | 2/1951 | Weller | 55—16 |

FOREIGN PATENTS

| 1,233,037 | 5/1960 | France. |

OTHER REFERENCES

Osburn, James, et al.: New Diffusion Cell Design, Ind. Eng. Chem., vol. 46, No. 4, April 1954, pages 739–742.

REUBEN FRIEDMAN, *Primary Examiner.*

FRANK W. LUTTER, *Examiner.*

J. ADEE, *Assistant Examiner.*